United States Patent [19]
Gustafsson

[11] 3,955,259
[45] May 11, 1976

[54] REVERSIBLE CUTTING INSERT FOR USE IN A ROTARY CUTTING TOOL

[75] Inventor: Manfred Wallace Gustafsson, Fagersta, Sweden

[73] Assignee: Sesco Tools AB, Fagersta, Sweden

[22] Filed: May 23, 1975

[21] Appl. No.: 580,221

[30] Foreign Application Priority Data
May 24, 1974 Sweden.............................. 7406908

[52] U.S. Cl................................ 29/95 R; 29/105 A
[51] Int. Cl.².......................... B26D 1/00; B26D 1/12
[58] Field of Search................ 29/95 R, 105, 105 A

[56] References Cited
UNITED STATES PATENTS

| | | | |
|---|---|---|---|
| 3,229,349 | 1/1966 | Leksell................................ | 29/95 |
| 3,289,271 | 12/1966 | Stier................................... | 29/95 |
| 3,497,933 | 3/1970 | Okada................................. | 29/95 |

*Primary Examiner*—Harrison L. Hinson
*Attorney, Agent, or Firm*—Pierce, Scheffler & Parker

[57] ABSTRACT

A reversible cutting insert, for a rotary cutting tool, is characterized by the provision thereon of two side-by-side bevel faces at each corner of the insert, which faces intersect edges at more than 90° and intersect opposite polygonal surfaces at edges of less than 90°.

4 Claims, 8 Drawing Figures

REVERSIBLE CUTTING INSERT FOR USE IN A ROTARY CUTTING TOOL

The present invention relates to a reversible cutting insert, of prismatic shape, for use in a rotary cutting tool the mantle surface of which comprises substantially plane top and bottom surfaces of polygonal shape and edge surfaces located therebetween. The top and bottom surfaces of this cutting element meet adjoining edge surfaces at right angles, their intersecting edges forming the primary cutting edges.

Reversible cutting inserts consisting of a polygonal flat plate have been proposed for use in face milling cutters, two side-by-side bevel faces being provided at each of the corners of the base surfaces of the cutting insert and respectively forming an acute angle with the top and bottom surfaces. The edges which are at an acute angle to either the top or bottom surface of the plate form secondary cutting edges, while being associated with an adjacent primary cutting edge for making the finishing cut.

In rotary cutting tools equipped with cutting inserts of the aforesaid design, all inserts are inserted in their appropriate slots with a positive axial rake and a negative radial rake, said cutting geometry oftentimes being defined in terms of "shear-clear". A rotary cutting tool fitted with cutting inserts of such geometry is advantageous because in certain combinations of rake angles the chips desirably are removed in a curl directed to the rear of the tool.

A milling cutter equipped with inserts of the aforesaid design, however, can only be expected to make a perfect curling cut if a perfect axial run can be achieved when said cutter traverses a workpiece, and such perfect axial run is, in practice, unachievable: some of the inserts located on a milling cutter project beyond the others, which means that some of the cutting inserts take a deeper cut than do others. Thus, it has been found that milling cutters are not free-cutting under all circumstances, which may cause the inserts to be turned outwardly from their pockets due to cutting forces which could result in damage to the rotary cutter.

To remedy the above disadvantage it is now proposed according to the present invention to provide a reversible cutting insert of the aforementioned type which is mainly characterized in that two side-by-side bevel faces are provided at each corner of said polygonal insert, both of which bevel faces intersect at edges of more than 90° with same polygonal top or bottom surface of said plate while intersecting with opposite polygonal surface at edges of less than 90°, one of said last-mentioned intersecting edges, which together with an adjacent main cutting edge extend towards a cutting tip, being formed as a secondary cutting edge for cooperation with said adjacent main cutting edge for making a finishing cut. Other characteristic features of the invention will be more closely defined in the appended claims.

The invention will now be described in greater detail and with reference to the accompanying drawings, in which.

Figure 1A:
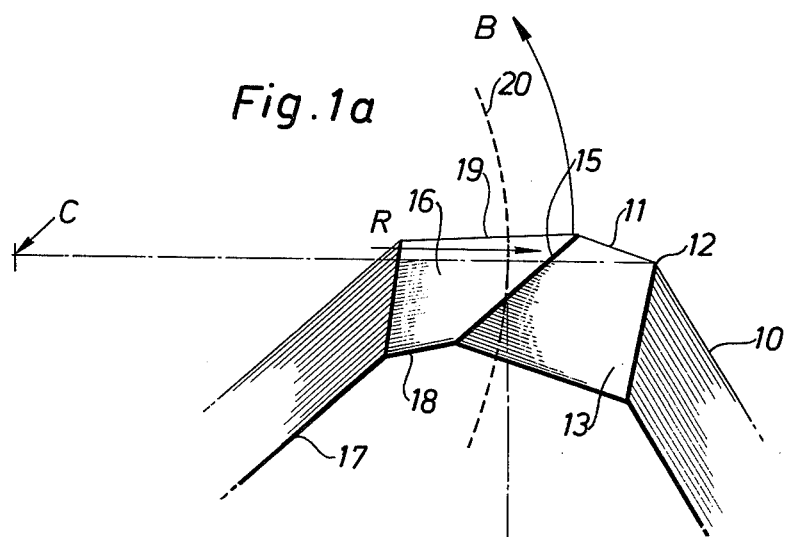
FIG. 1a is an enlarged view of a cutting corner of an insert of conventional design.
Figure 1B:
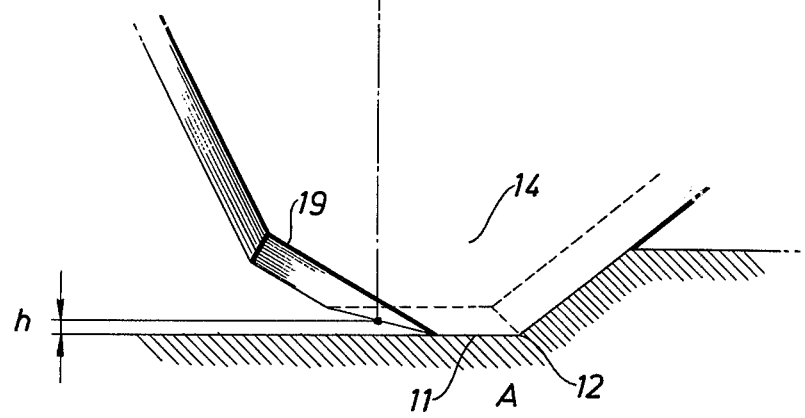
FIG. 1b is an enlarged view of same corner as seen from the chip side.

In FIGS. 1a and 1b there is shown a cutting insert of conventional design for face milling cutters. The main cutting edge 10 and the secondary cutting edge 11 extend towards the cutting tip 12, said secondary cutting edge 11 constituting the finish cutting edge for making a finishing cut with a workpiece "A". The clearance face of the secondary cutting edge 11 is designated 13, said face 13 meeting with the polygonal face 14 at an acute angle at edge 11. Radially towards the center "C" of the milling cutter said face 13 meets with an adjacent bevel face 16 at an edge 15. The bevel face 16 constitutes the clearance face of a secondary cutting edge 18 associated with a main cutting edge 17, and it intersects with polygonal surface 14 at an edge 19 of more than 90°. The insert is intended to make cuts in workpiece A when fitted in place in the milling cutter with positive axial rake and negative radial rake.

As a consequence of the above-related cutting geometry, bevel face 16 has a negative slope in the rotary direction "B". Thus, the outermost portion of said bevel face 16 of an insert, which projects axially in front of the others, will engage the workpiece when said insert is passing by.

The result thereof will be a force "R", directed away from the center C, which force tends to turn the insert out from its site. If it is assumed that the insert projects a distance h (FIG. 1b) beyond the others, it will be affected by radial forces R acting on that part of bevel face 16 which is located between the edge 11 and the arc of a circle 20. Even if some insert projects only a slight distance beyond the others, said forces are sufficient to cause the insert to come free from its site.

Figure 2A:
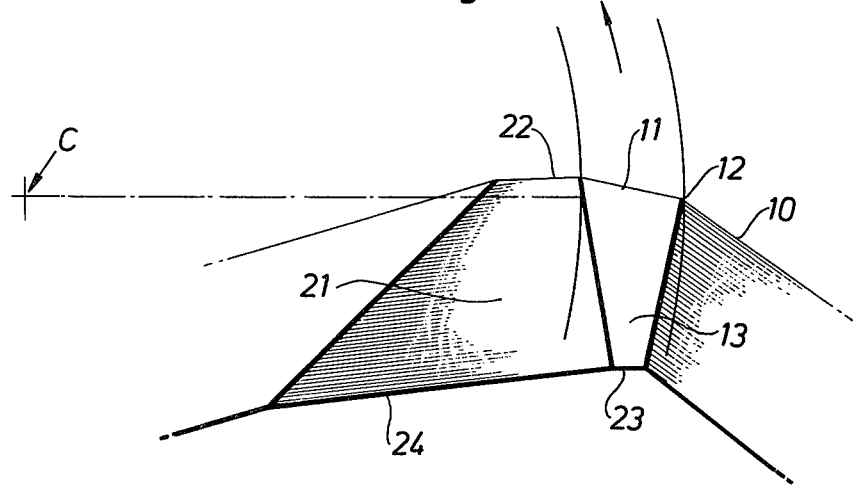
FIG. 2a is an enlarged view of a cutting corner of an insert according to the invention.
Figure 2B:
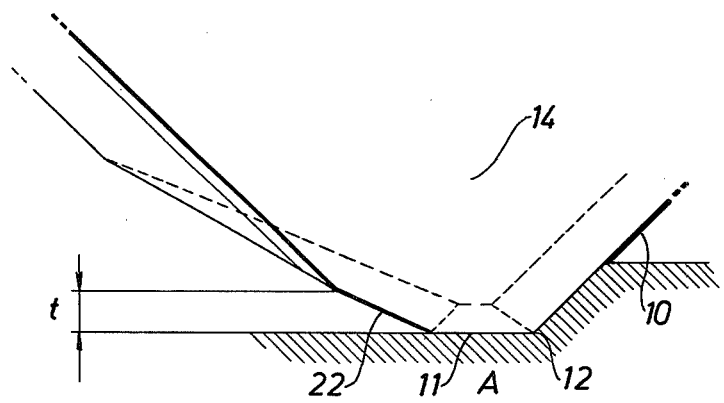
FIG. 2b is an enlarged view of same corner as seen from the chip side.

According to the present invention, the above-related inconveniences are eliminated in a negative cutting insert by having the corners thereof configured as shown in FIGS. 2a and 2b, where those portions which correspond with similar portions in FIGS. 1a and 1b have the same reference numbers. Each cutting corner is now provided with two side-by-side bevel faces 13, 21 both of which have a positive slope in the cutting direction B relative to top surface 14, i.e. both meet with said top surface 14 at edges 11, 22 of less than 90° while meeting with the opposite bottom surface at edges of more than 90°, said last-mentioned edges being enumerated 23 and 24 respectively. The radial component of the cutting force that could act on edge 22 will be balanced out by an opposite force component from the main cutting edge 10. The above-related configuration enables each cutting corner to be free-cutting up to a depth $t$ (FIG. 2b) without being turned from its site.

In a preferred embodiment of the invention the insert is of rectangular shape, the top and bottom surfaces meeting with the edge surfaces at right angles. Each of the corners of the insert is provided with side-by-side bevel faces in accordance with the invention. According to another embodiment, the insert may be square. Cutting inserts of such design where the edge surfaces of the insert meet at right angles are preferable because, — taking the permissible tolerance range of manufacture into account, — a cutting edge thereof will come out relative to the insert's site to a less extent than compared with an insert of other design. For instance, taking the diameter deviations of an inscribed circle as a tolerance range, the cutting edge of a square insert will come out a distance relative to its site which is 50 percent of that encountered with a triangular insert. These circumstances are of importance when a face milling cutter body is equipped with such inserts.

Figure 3:
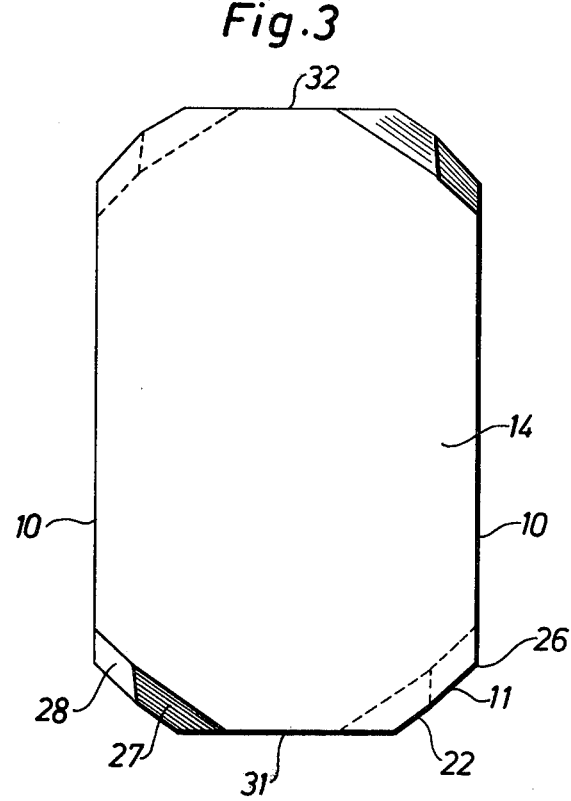
FIG. 3 is a top view of an embodiment of the invention.
Figure 4:
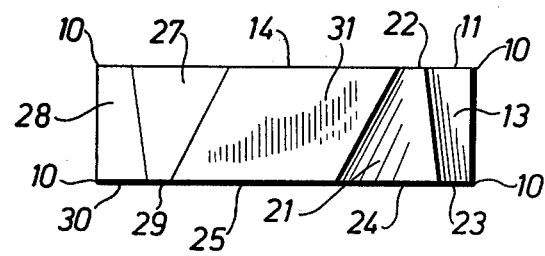
FIG. 4 is an end view of the embodiment of FIG. 3.

A reversible rectangular cutting insert as shown in FIGS. 3 and 4 comprises substantially flat top and bottom surfaces located at right angles to their intersection with the edge surfaces. Their intersecting edges which extend longitudinally of the insert form the primary cutting edges 10, of which latter the insert has four. The insert is, at each corner, provided with two side-by-side bevel faces 13, 21 both of which are at an acute angle to either top or bottom surface of the insert. In FIGS. 3 and 4 said bevel faces 13, 21 are at an acute angle to top surface 14 while intersecting with bottom surface 25 at angles of more than 90°. Two side-by-side trapezoidal bevel faces, congruent with bevel faces 13, 21, are provided at the diagonally opposed corner, at an acute angle to top surface 14. At the corners therebetween similar bevel faces are provided but then forming an acute angle with the bottom surface 25 of the insert, thus intersecting with top surface 14 at angles of more than 90°.

The bevel face 21 intersects with the top surface or, chip surface) 14 at an edge 22 of less than 90° and likewise the bevel face 13 intersects with the chip surface 14 at an edge 11 less than 90°. The said last edge 11 meets with associated main cutting edge 10 at cutting tip 26. Said edge 11 defining a secondary or finishing cutting edge. The said bevel faces 13, 21 intersect with bottom surface 25 at edges 23 and 24 of more than 90°. Likewise bevel faces 27 and 28 intersect with said bottom surface 25 at edges of less than 90°, indicated 29 and 30 respectively, said last edge 30 defining a secondary cutting edge intended to co-operate with an associated main cutting edge. The insert thus comprises four main cutting edges and four finish cutting edges associated therewith.

The aforesaid first pair of bevel faces 13, 21 are separated from said second pair of bevel faces 27, 28 by a flat surface 31 which extends across said rectangular cutting plate, said flat surface 31 being in the shape of a parallelogram located perpendicularly to said top and bottom surfaces 14, 25 and also perpendicular to those edge surfaces which intersect with said top and bottom surfaces at right angles to define the primary cutting edges 10. Similarly a flat surface 32 located at the opposite end portion of the rectangular cutting plate is perpendicular to the same surfaces as above related. In the clamped position in a milling cutter, said flat surfaces 31, 32 engage co-operating axial abutment surfaces in the cutter body.

Figure 5:
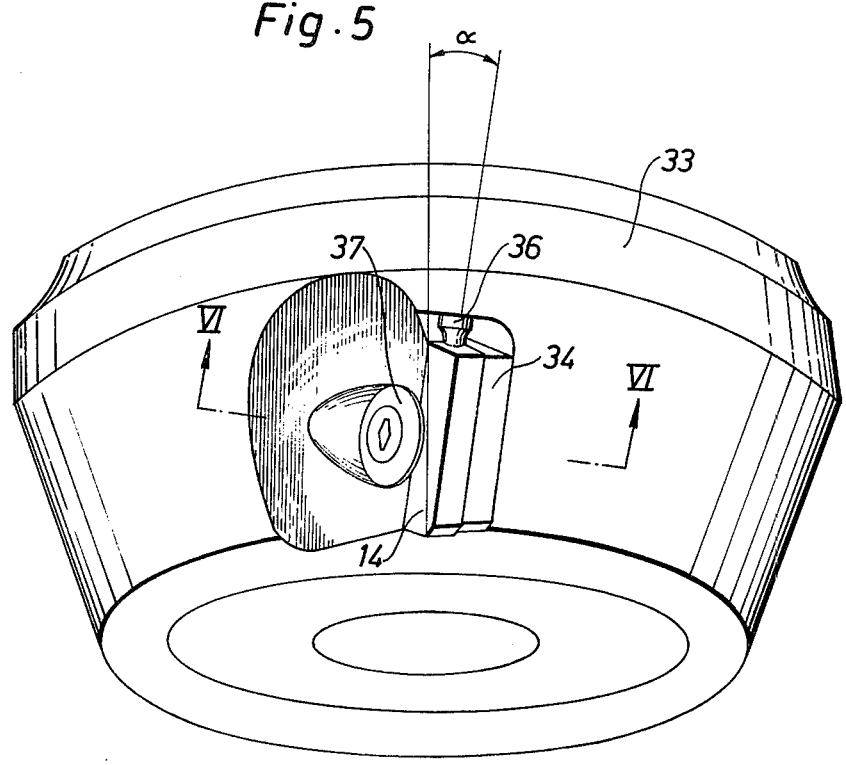
FIG. 5 is an elevational view of a milling cutter showing only one cutting insert with associated clamping means.
Figure 6:
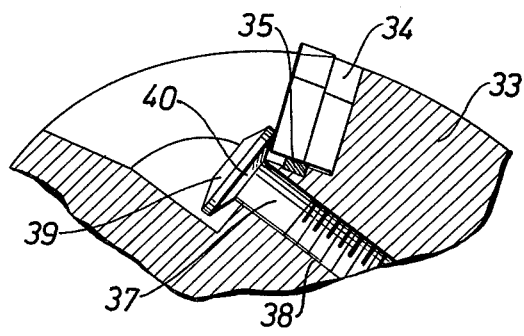
FIG. 6 is a sectional view along the line VI—VI in FIG. 5.

Referring now to FIGS. 5–6, a rotary cutting tool is so formed as to be equipped with cutting inserts such as hereinbefore described. In the drawing, a cutter body 33 of a milling cutter has sites spaced around the circumference thereof, in which sites cutting inserts are arranged, of which only one is shown for clearer representation. The insert is inserted in its site in such manner that a positive axial rake and a negative radial rake are obtained. The axial rake angle is indicated "α". The insert site comprises a plain bottom supporting surface provided by a shim plate 34, and edge supports 35 and 36 are provided for supporting two of the insert edge surfaces in the radial and axial direction respectively, said axial support 36 being provided by a cylindrical pin secured to the cutter body which abuts against one of flat surfaces 31, 32 provided at the end portion of the insert.

The clamping means adapted safely to secure each insert in its site comprises a clamp screw 37 received in a lengthwise partly threaded bore 38 disposed adjacent said site. The head 39 of the screw 37 is adapted to engage a top surface of the insert in order, when said screw is tightened, to press it in a direction towards it complementary supports in said site. The longitudinal axis of said screw forms an acute angle to the plane of the top surface of the insert, and the lower surface of the screw head 39 is provided with a chamfer 40 which provides linear contact against said top surface. Due to the above-described inclination of the bore 38 relative to said insert the result is achieved that said insert is urged against said bottom supporting surface and said edge supports when said screw is tightened.

I claim:

1. A reversible cutting insert for a milling cutter having sites for holding the insert in different cutting positions, said insert being in the shape of a rectangular block of cutting material comprising two opposite and parallel top and bottom surfaces, two opposite and mutually parallel edge surfaces located between said top and bottom surfaces both of which intersect with said top and bottom surfaces at right angles to define four parallel primary cutting edges, each end of said block having four bevel faces extending across such end from said top surface to said bottom surface, two side-by-side bevel faces at each block end forming an acute angle with the top surface and an obtuse angle with the bottom surface, the other two bevel faces at same block end similarly forming an acute angle with the bottom surface and an obtuse angle with the top surface, one of said junctions at an acute angle with said top and bottom surfaces defining an edge which meets with an associated main cutting edge into a cutting tip, while defining a finishing edge to cooperate with said primary cutting edge.

2. A cutting insert as defined in claim 1, in which said two pairs of bevel faces at each block end are separated from each other by a flat surface extending diagonally across the end at right angles to the top and bottom surfaces and said edge surfaces located therebetween, said flat surface being in the shape of a parallelogram and adapted for abutment with an axial abutment surface in the insert site of the milling cutter.

3. A cutting insert as defined in claim 1, in which said bevel faces at the ends of the block are of generally trapezoidal shape.

4. A rotary milling cutter comprising a cutter body having spaced about its circumference a plurality of sites for holding cutting inserts in different cutting positions, each site having therein two edge support surfaces and shim plate means providing a plain bottom supporting surface for a cutting insert; a reversible cutting insert in one of said sites; and clamping means comprising a lengthwise partially threaded bore adjacent said site and a clamp screw in said bore, said clamp screw having a head engaging a top surface of said cutting insert, said cutting insert being in the shape of a rectangular block of cutting material comprising two opposite and parallel top and bottom surfaces, two opposite and mutually parallel edge surfaces located between said top and bottom surfaces both of which intersect with said top and bottom surfaces at right angles to define four parallel primary cutting edges, each end of said block having two pairs of bevel faces and an intermediate flat surface extending entirely across such end, said flat surface being in abutment with an axial support in the site, two side-by-side bevel faces at each block end forming an acute angle with the top surface and an obtuse angle with the bottom surface, the other two bevel faces at same block end similarly forming an acute angle with the bottom surface and an obtuse angle with the top surface, one of said junctions at an acute angle with said top and bottom surfaces defining an edge which meets with an associated main cutting edge into a cutting tip, while defining a finishing cutting edge to cooperate with said primary cutting edge, said insert being inserted in its site with a positive axial rake and a negative radial rake.

* * * * *

UNITED STATES PATENT OFFICE
CERTIFICATE OF CORRECTION

PATENT NO. : 3,955,259
DATED : May 11, 1976
INVENTOR(S) : Manfred Wallace Gustafsson It is certified that error appears in the above-identified patent and that said Letters Patent are hereby corrected as shown below:

[73]  Seco Tools AB, Fagersta, Sweden

Signed and Sealed this

Tenth Day of May 1977

[SEAL]

Attest:

RUTH C. MASON
*Attesting Officer*

C. MARSHALL DANN
*Commissioner of Patents and Trademarks*